(12) United States Patent
Matsueda et al.

(10) Patent No.: US 9,849,441 B2
(45) Date of Patent: Dec. 26, 2017

(54) EXHAUST GAS PURIFYING CATALYST

(71) Applicant: CATALER CORPORATION, Kakegawa-shi, Shizuoka (JP)

(72) Inventors: Satoshi Matsueda, Kakegawa (JP); Akimasa Hirai, Kakegawa (JP); Kenichi Taki, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/037,345

(22) PCT Filed: Dec. 4, 2014

(86) PCT No.: PCT/JP2014/082148
§ 371 (c)(1),
(2) Date: May 18, 2016

(87) PCT Pub. No.: WO2015/087781
PCT Pub. Date: Jun. 18, 2015

(65) Prior Publication Data
US 2016/0279607 A1 Sep. 29, 2016

(30) Foreign Application Priority Data

Dec. 9, 2013 (JP) .................................. 2013-254479

(51) Int. Cl.
*B01J 23/10* (2006.01)
*B01J 23/63* (2006.01)
(Continued)

(52) U.S. Cl.
CPC ............ *B01J 23/10* (2013.01); *B01D 53/945* (2013.01); *B01J 23/42* (2013.01); *B01J 23/44* (2013.01);
(Continued)

(58) Field of Classification Search
CPC . B01J 23/10; B01J 23/464; B01J 23/44; B01J 23/42; B01J 37/031; B01J 35/0006;
(Continued)

(56) References Cited

U.S. PATENT DOCUMENTS 5,958,827 A    9/1999  Suda et al.
2006/0276331 A1  12/2006  Akamine et al.
(Continued)

FOREIGN PATENT DOCUMENTS

EP    1704910 A2    9/2006
EP    2374525 A1   10/2011
(Continued)

OTHER PUBLICATIONS

Feb. 10, 2015 International Search Report issued in International Patent Application No. PCT/JP2014/082148.
(Continued)

*Primary Examiner* — Haytham Soliman
(74) *Attorney, Agent, or Firm* — Oliff PLC

(57) ABSTRACT

The exhaust gas-purifying catalyst of the invention contains oxide particles having interdispersed therein A crystallites that are loaded with a noble metal and B crystallites that are not loaded with a noble metal. The A crystallites loaded with a noble metal are composed of an oxide containing at least one of zirconium (Zr) and cerium (Ce). The B crystallites not loaded with a noble metal are composed of a cerium (Ce)-containing oxide which has a higher Ce content (mol %) than the oxide making up the A crystallites. The oxide particles have a specific surface area after 5 hours of heat treatment at 1,150° C. in open air of 30 $m^2/g$ or more.

5 Claims, 5 Drawing Sheets

(51) Int. Cl.
*B01J 37/03* (2006.01)
*B01J 35/00* (2006.01)
*B01J 35/10* (2006.01)
*B01D 53/94* (2006.01)
*B01J 23/42* (2006.01)
*B01J 23/44* (2006.01)
*B01J 23/46* (2006.01)
*F01N 3/28* (2006.01)

(52) U.S. Cl.
CPC ............ *B01J 23/464* (2013.01); *B01J 23/63* (2013.01); *B01J 35/002* (2013.01); *B01J 35/0006* (2013.01); *B01J 35/1014* (2013.01); *B01J 37/031* (2013.01); B01D 2255/1021 (2013.01); B01D 2255/1023 (2013.01); B01D 2255/1025 (2013.01); B01D 2255/2045 (2013.01); B01D 2255/2061 (2013.01); B01D 2255/2063 (2013.01); B01D 2255/2065 (2013.01); B01D 2255/2068 (2013.01); B01D 2255/20715 (2013.01); B01D 2255/407 (2013.01); B01D 2255/908 (2013.01); B01D 2255/9202 (2013.01); B01D 2255/9207 (2013.01); B01J 2523/00 (2013.01); *F01N 3/2828* (2013.01); *Y02T 10/22* (2013.01)

(58) Field of Classification Search
CPC ...... B01J 35/1014; B01J 35/002; B01J 23/63; B01J 2523/00; B01D 53/945; B01D 2255/908; B01D 2255/1025; B01D 2255/2063; B01D 2255/20715; B01D 2255/2068; B01D 2255/2045; B01D 2255/9207; B01D 2255/2061; B01D 2255/407; B01D 2255/9202; B01D 2255/2065; B01D 2255/1021; B01D 2255/1023; Y02T 10/22; F01N 3/2828

USPC ....................................................... 502/304
See application file for complete search history.

(56) References Cited

U.S. PATENT DOCUMENTS

| | | | |
|---|---|---|---|
| 2008/0009410 | A1 | 1/2008 | Okamoto et al. |
| 2009/0107124 | A1 | 4/2009 | Yamada et al. |
| 2010/0004123 | A1* | 1/2010 | Kimura .................. B01D 53/02 502/304 |
| 2011/0301026 | A1 | 12/2011 | Akamine et al. |
| 2012/0094827 | A1 | 4/2012 | Matsueda et al. |
| 2012/0309616 | A1 | 12/2012 | Yagishita et al. |

FOREIGN PATENT DOCUMENTS

| | | |
|---|---|---|
| EP | 2404668 A1 | 1/2012 |
| EP | 2692430 A1 | 2/2014 |
| JP | H09-155192 A | 6/1997 |
| JP | 2006-334490 A | 12/2006 |
| JP | 2008-013423 A | 1/2008 |
| JP | 2008-289985 A | 12/2008 |
| JP | 2009-106858 A | 5/2009 |
| JP | 2011-255272 A | 12/2011 |
| JP | 2014-171971 A | 9/2014 |
| NO | 2011/108457 A1 | 9/2011 |
| WO | 2010/119904 A1 | 10/2010 |

OTHER PUBLICATIONS

Jun. 23, 2016 International Preliminary Report on Patentability issued in International Patent Application No. PCT/JP2014/082148.

* cited by examiner

EXHAUST GAS PURIFYING CATALYST

TECHNICAL FIELD

The present invention relates to an exhaust gas purifying catalyst that can be provided in the exhaust system of an internal combustion engine.

This international application claims priority from Japanese Patent Application No. 2013-254479 filed on Dec. 9, 2013, the entire contents of which are incorporated herein by reference.

BACKGROUND ART

Three-way catalysts, so-called because they can simultaneously carry out the oxidation of carbon monoxide (CO) and hydrocarbons (HC) and the reduction of nitrogen oxides ($NO_x$), are used for efficiently eliminating noxious components such as CO, HC and $NO_x$ present in the exhaust gases of internal combustion engines such as automotive engines. Catalysts used as such three-way catalysts are composed of noble metals belonging to the platinum group (PGM), such as platinum (Pt), rhodium (Rh) and palladium (Pd), that are supported on a porous carrier made of a metal oxide such as alumina ($Al_2O_3$). Three-way catalysts containing a plurality of such PGM noble metals are able to exhibit an especially high exhaust gas purifying catalyst function on the exhaust gases generated from burning, within an internal combustion engine, a mixed gas near the stoichiometric air-fuel ratio (also abbreviated as "stoich":A/F=14.7).

However, continuing to maintain the air-fuel ratio of the mixed gas supplied when actually using an internal combustion engine (typically when operating an automobile) at a near-stoichiometric ratio is difficult. That is, for example, depending on the running conditions of the automobile, the air-fuel ratio of the mixed gases may have excess fuel (referred to as "rich": A/F<14.7), or may have excess oxygen (referred to as "lean": A/F>14.7). It has become common recently to include inorganic materials having an oxygen storage capacity (OSC), also referred to as "OSC materials," within catalyst carriers.

In three-way catalysts, composite oxides composed primarily of ceria ($CeO_2$) and zirconia ($ZrO_2$) (also referred to below as "CZ composite oxides") have been used to date as OSC materials. For example, Patent Document 1 discloses an example of a conventional exhaust gas-purifying catalyst provided with an OSC material made of a CZ composite oxide for which the solid solubility of zirconium oxide in cerium oxide is 50% or more and which is characterized in that the crystallites making up the particles of CZ composite oxide have an average diameter of 100 nm or less. Patent Document 2 teaches a method of producing particles of a CZ composite oxide used as an OSC material, which particles have a crystallite diameter of about 10 nm.

CITATION LIST

Patent Literature

Patent Document 1: Japanese Patent Application Publication No. H09-155192
Patent Document 2: Japanese Patent Application Publication No. 2008-289985

SUMMARY OF INVENTION

However, one drawback of the CZ composite oxides used as such OSC materials is their low heat resistance. That is, in particles (primary particles) composed of a conventional CZ composite oxide, crystal growth of the crystallites making up the particles readily arises at elevated temperatures (e.g., in endurance tests) and is accompanied by agglomeration of the noble metals supported on an OSC material made of such a CZ composite oxide, which may lead to a decline in the number of active sites. Hence, there exists a desire for the heat resistance of CZ composite oxides used as OSC materials to be increased. More specifically, it is desired that crystal growth of the crystallites making up CZ composite oxide particles be suppressed and that the CZ composite oxide have an enhanced heat resistance capable of suppressing both noble metal agglomeration and decreases in OSC function.

The inventors, in order to suppress crystal growth of the crystallites making up the CZ composite oxide particles, are investigating the use of CZ composite oxide particles having interdispersed therein two types of crystallites with mutually differing crystal structures (more specifically, differing lattice constants). According to the findings of the inventors, by interdispersing two types of crystallites having mutually differing crystal structures, the different types of crystallites form barriers therebetween, thus impeding crystal growth and making it possible to suppress agglomeration of the noble metal and a decline in OSC function. This invention aims to further increase the catalyst performance in such exhaust gas-purifying catalysts wherein two types of crystallites having mutually differing crystal structures are interdispersed.

The inventors have discovered that, in exhaust gas-purifying catalysts containing composite oxide particles wherein two types of crystallites having mutually differing crystal structures are interdispersed, by supporting a noble metal on crystallites having a lower Ce content and not supporting a noble metal on crystallites having a higher Ce content, the catalyst performance can be further enhanced.

Accordingly, the exhaust gas-purifying catalyst disclosed herein contains oxide particles having interdispersed therein a mixture of A crystallites that are loaded with a noble metal and B crystallites that are not loaded with a noble metal. The A crystallites loaded with a noble metal consist of an oxide containing at least one of zirconium (Zr) and cerium (Ce). The B crystallites not loaded with a noble metal consist of a cerium (Ce)-containing oxide having a higher Ce content (mol %) than the oxide making up the A crystallites.

In the catalyst of the invention, by containing oxide particles having interdispersed therein A crystallites and B crystallites, it is possible to suppress crystal growth even when the catalyst is used under high-temperature conditions such as in heat endurance tests, and to suppress agglomeration of the noble metal consisting of platinum group metals that is supported on the A crystallites. Moreover, by supporting a noble metal on the A crystallites having a lower Ce content and not supporting a noble metal on the B crystallites having a higher Ce content, the metallic state of the noble metal is properly maintained, enabling an even higher OSC function to be achieved. This invention is thus capable of providing a high-performance exhaust gas-purifying catalyst that further enhances the three-way performance of three-way catalysts.

The exhaust gas-purifying catalyst disclosed herein is characterized in that the oxide particles within which are interdispersed A crystallites and the B crystallites have a specific surface area after 5 hours of heat treatment at 1,150° C. in open air of 30 $m^2$/g or more. Because crystal growth can be suppressed even when the catalyst is used under high-temperature conditions, this high specific surface area can be maintained and a high catalytic activity (typically, three-way performance) can be maintained. Also, by maintaining such a high specific surface area, a larger number of A crystallites loaded with noble metal are arranged around the B crystallites not loaded with noble metal, which shortens the distance between the B crystallites and the noble metal, allowing the OSC function of the B crystallites to be better manifested. Therefore, even though the B crystallites do not support a noble metal, a high-performance exhaust gas-purifying catalyst capable of exhibiting a high OSC performance can be obtained.

In a preferred embodiment of the exhaust gas-purifying catalyst disclosed herein, the Ce content in the oxide making up the A crystallites, expressed in terms of cerium oxide, is from 0 to 30 mol % of the total oxide, and the Ce content in the oxide making up the B crystallites, expressed in terms of cerium oxide, is from 35 to 99 mol % of the total oxide. This enables a particularly high crystal growth-suppressing ability and OSC function (and, in turn, three-way performance) to be achieved.

In another preferred embodiment of the exhaust gas-purifying catalyst disclosed herein, the A crystallites consist of an oxide containing zirconium and also yttrium (Y). With A crystallites consisting of an oxide containing these metal ingredients, a higher crystal growth-suppressing ability can be achieved.

In yet another preferred embodiment of the exhaust gas-purifying catalyst disclosed herein, the B crystallites consist of an oxide containing cerium and also zirconium. With B crystallites which consist of an oxide containing these metal ingredients, a higher crystal growth-suppressing ability and OSC function can be achieved.

Moreover, in the exhaust gas-purifying catalyst disclosed herein, the A crystallites and the B crystallites are characterized in that the A crystallites and the B crystallites are each present within the oxide particles in a highly dispersed manner such that, as observed by electron microscopy, ten or more of the same type of crystallite are nowhere mutually contiguous.

Here, "ten or more of the same type of crystallite are nowhere mutually contiguous" means that, as seen from a single randomly selected crystallite in electron microscopic observation (typically a transmission electron micrograph, referred to below as a "TEM image"), of the other crystallites present thereabout, the nine crystallites in the closest positions thereto cannot all be the same type of crystallite as the selected crystallite. In other words, in electron microscopic observation (typically a TEM image), ten or more crystallites of the same type are not present together; rather, the crystallites are in a state that is highly dispersed to a degree where, when ten crystallites in mutual proximity are randomly picked up in electron microscopy, at least one of the crystallites is of a different type than the other nine crystallites. When electron microscopy is carried out in a plurality of fields (e.g., in different TEM images), this refers to the average value for all the fields.

In oxide particles wherein such a highly dispersed state is maintained, a particularly high crystal growth suppressing ability and OSC function can be achieved. A dispersed state in which seven or more (preferably five or more, and more preferably three or more) of the same type of crystallite are nowhere mutually contiguous is especially desirable.

DESCRIPTION OF EMBODIMENTS

Figure 1:
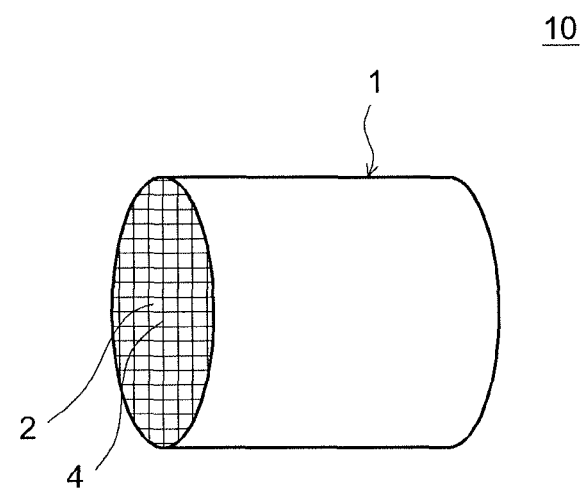
FIG. 1 is a perspective view schematically showing an example of an exhaust gas-purifying catalyst.

Several preferred embodiments of the invention are described below while referring to the diagrams. Matters which are required for carrying out the present invention but concerning which no particular mention is made in the present specification may be understood as matters for design by persons skilled in the art based on prior art in the field. The present invention can be practiced on the basis of details disclosed in this specification and technical knowledge in the field.

In this specification, "crystallite" refers to the largest collection of basic structures that is composed of a series of connected crystal lattices and can be regarded as a single crystal (which collection is a particle). The nature of the crystallites can be investigated by carrying out, for example, XRD (x-ray diffraction analysis) and Rietveld analysis. The presence of crystallites can be determined by electron microscopy (typically TEM). Elemental analysis and compositional analysis of target crystallites can be carried out by using electron microscopy and EDX (energy-dispersive x-ray spectrometry) in combination (e.g., TEM-EDX).

The exhaust gas-purifying catalyst disclosed herein is characterized by being provided, in at least some portion of a catalyst layer, with oxide particles formed, in a highly mixed (interdispersed) manner, of the abovementioned two different types of crystallites (A and B), aside from which there are no particular limitations on the structure. This catalyst, which may typically be used as an exhaust gas-purifying catalyst disposed as a three-way catalyst in the exhaust pipe of an internal combustion engine, generally has a substrate and a catalyst layer which is formed on top of the substrate and contains both a noble metal that functions as an oxidation catalyst and/or a reduction catalyst and also the above-described oxide particles.

The exhaust gas-purifying catalyst disclosed herein can be disposed in the exhaust system (exhaust pipe) of various types of internal combustion engines, and particularly automotive gasoline engines, by suitably selecting the subsequently described noble metals, oxide particles and type of substrate, and molding to a desired shape appropriate for the intended application.

The explanation given below is premised on the use of the exhaust gas-purifying catalyst of the invention primarily as a three-way catalyst installed in the exhaust pipe of automotive gasoline engines, although it is not intended that the exhaust gas-purifying catalyst disclosed here be limited to the embodiments described below.

<Substrate>

When the exhaust gas-purifying catalyst disclosed herein is installed in an exhaust pipe, substrates of various materials and forms hitherto used in this type of application may be employed as the substrate making up the catalyst skeleton. For example, substrates made of ceramics having a high temperature resistance, such as cordierite or silicon carbide (SiC), or of alloys (e.g., stainless steel) may be used.

The shape also may be similar to that in conventional exhaust gas-purifying catalysts. One such example is a honeycomb substrate 1 which, as in the exhaust gas-purifying catalyst 10 shown in FIG. 1, has an exterior shape in the form of a round cylinder and is provided in the direction of the cylinder axis with throughholes (cells) 2 serving as exhaust gas flow channels, and in which exhaust gases are able to come into contact with partition walls (rib walls) 4 defining individual cells 2. The substrate 1 may be rendered into shapes other than a honeycomb shape, such as a foam shape or a pellet shape. In place of a round cylindrical shape, an elliptical cylindrical shape or a polygonal cylindrical shape may also be used as the outer shape of the overall substrate.

<Catalyst Layer>

Figure 2:
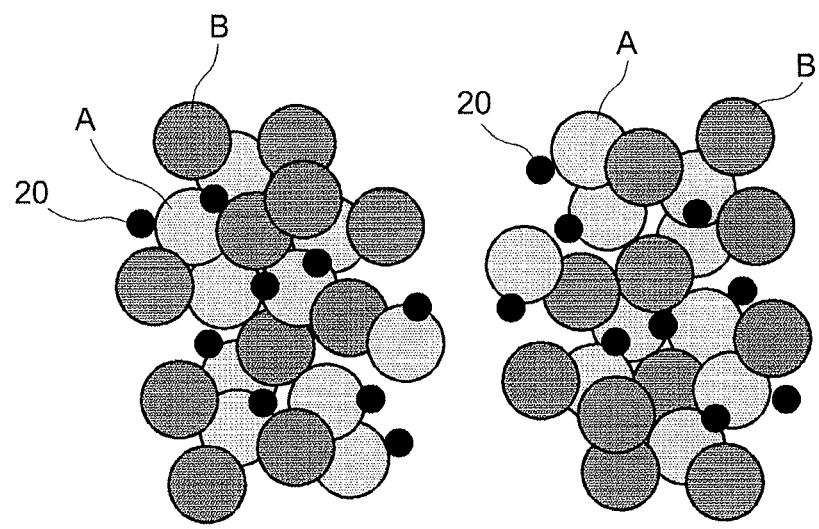
FIG. 2 is a diagram schematically showing the essential features of a catalyst layer according to one embodiment.

The catalyst layer formed on the substrate serves as the site of exhaust gas purification and thus is composed primarily of a catalyst which purifies this type of exhaust. As shown in FIG. 2, the catalyst layer is typically composed of noble metal particles 20 and oxide particles having interdispersed therein A crystallites that are loaded with a noble metal and B crystallites that are not loaded with a noble metal. For example, when the honeycomb substrate 1 shown in FIG. 1 is used, a catalyst layer of a given thickness and porosity is formed on the rib walls 4 defining the cells of the substrate 1. The catalyst layer may consist of a single layer having substantially the same composition, or may be a catalyst layer having a laminated structure consisting of two layers (a top layer and a bottom layer), or of three or more layers, formed on the substrate 1 as mutually differing layers.

<Noble Metal>

Various metals capable of functioning as oxidation catalysts or reduction catalysts may be used as the noble metals 20 provided in the catalyst layer of the exhaust gas-purifying catalyst disclosed herein. Typical examples include palladium group metals such as rhodium (Rh), platinum (Pt) and palladium (Pd). Other metals such as ruthenium (Ru), osmium (Os), iridium (Ir), silver (Ag) and copper (Cu) may also be used. Two or more of these noble metals may be used in an alloyed form. Other metals may be included as well (typically in the form of an alloy).

Of these, the use of Rh, which has a high reducing activity, in combination with Pd or Pt, which have high oxidizing activities, is especially preferred for building a three-way catalyst. For example, it is desirable to support Rh and either Pt or Pd on an OSC material made of the two different types of crystallites A and B.

To increase the surface area of contact with exhaust gases, such noble metals are preferably used as micro-particles of a sufficiently small particle size. Typically, the average particle size (which refers, here and below, to the average particle size determined by TEM) of such metal particles is about 1 to 15 nm, preferably 10 nm or less, more preferably 7 nm or less, and most preferably 5 nm or less.

The loading of such noble metals 20 (i.e., the noble metal content, relative to 100 mass % for the carrier) is preferably 5 mass % or less, and more preferably 3 mass % or less. For example, the loading is preferably at least 0.05 mass % and up to 5 mass %, and more preferably at least 0.1 mass % and up to 3 mass %. At loadings far below this range, catalytic effects by the metal are difficult to obtain. At loadings far above this range, growth of the metal grains may proceed, in addition to which such loadings are disadvantageous in terms of cost.

<Oxide Particles>

The oxide particles disclosed here are composed of interdispersed therein, A crystallites that are loaded with the noble metal 20 (that is, the A crystallites are used as carriers) and B crystallites that are not loaded with the noble metal 20. These oxide particles containing the differing A crystallites and B crystallites are provided on the upstream side and/or downstream side in the exhaust gas flow direction within a catalyst layer. The A crystallites that are loaded with a noble metal consist of an oxide containing at least one of Zr and Ce. The B crystallites that are not loaded with a noble metal consist of a Ce-containing oxide which has a higher Ce content (mol %) than the oxide making up the A crystallites. By interdispersing these two types of crystallites A and B, crystal growth even after, e.g., 5 hours of heat treatment at 1,150° C. in open air can be suppressed and a high specific surface area of typically 30 $m^2/g$ or more (preferably 35 $m^2/g$ or more, and more preferably 40 $m^2/g$ or more) can be maintained. Also, by supporting a noble metal on the A crystallites having a lower Ce content and not supporting a noble metal on the B crystallites having a higher Ce content, the metallic state of the noble metal is properly maintained, enabling an even higher OSC function to be achieved.

The types and numbers of constituent elements in the A crystallites and the B crystallites are not particularly limited, provided these differing crystallites, by having mutually differing crystal structures, and more specifically mutually differing lattice constants, are able to form barriers therebetween, hindering crystal growth at elevated temperatures.

<A Crystallites>

For example, when the A crystallites (here, "A" and "B" are merely symbols to distinguish between the types of crystallites) that are loaded with a noble metal 20 are composed primarily of Zr, other elements may be included, such as one, two or more from among yttrium (Y), lanthanum (La), neodymium (Nd), praseodymium (Pr), samarium (Sm) and europium (Eu), and also alkaline earth elements such as calcium. A preferred example is A crystallites consisting of a composite oxide having a Zr content, expressed in terms of the oxide, of 75 to 99 mol % of the total oxide and containing also a small amount of Y (such as 5 mol % or less, or 10 mol % or less). Another preferred example is A crystallites consisting of an oxide which is composed primarily of Zr and has a Ce content, expressed in terms of the oxide, of 30 mol % or less of the total oxide (preferably 20 mol % or less, and more preferably 10 mol % or less, such as 0 mol % (meaning that it contains no Ce)).

<B Crystallites>

The B crystallites that are not loaded with a noble metal 20 have a higher Ce content than the A crystallites and may include as other elements Zr and also one, two or more rare-earth elements (La, Y, Nd, Pr, Sm, Eu, etc.). For example, B crystallites consisting of an oxide having a Ce content which, expressed in terms of the oxide, is from 35 to 99 mol % of the total oxide, and containing also a small amount of La (e.g., 5 mol or less, or 10 mol % or less) are preferred.

The average size of the A and B crystallites may be similar to that of crystallites making up OSC materials used in conventional exhaust gas-purifying catalysts (e.g., CZ composite oxides), and is typically from 2 to 100 nm, and preferably about 5 to 50 nm, as determined by electron microscopy such as TEM.

Oxide particles composed of A crystallites and B crystallites having mutually differing crystal structures (lattice constants) can be obtained by mixing a precursor (unfired material) A prepared beforehand from various compounds so as to include the elements making up the A crystallites (typically, metal salts that include the constituent metallic elements, such as nitrates, ammonium salts and phosphates of respectively, Zr, Ce and rare-earth elements) and a precursor (unfired material) B similarly prepared beforehand from various compounds so as to include the elements making up the B crystallites (typically, various metal salts) together with suitable oxidizing agents, such as various organic acids and hydrogen peroxide, and firing the mixture under oxidizing conditions (typically in open air). A preferred embodiment of such oxide particles is described below.

<Crystallite A Precursor Preparation Step>

This production method includes a step in which an A crystallite precursor is obtained by causing a co-precipitate to settle out from an aqueous solution containing the constituent elements of the A crystallites (crystallite A precursor preparation step). The solvent (aqueous solvent) in the aqueous solution is typically water, and may be a mixed solvent composed primarily of water. For example, it is desirable to use an aqueous solution that contains, in an aqueous solvent, compounds capable of supplying Ce ions, Zr ions and the like. This crystallite A precursor preparation step may include the stage of heating the aqueous solution to between 80° C. and 100° C. (preferably between 90° C. and 95° C.), then causing a co-precipitate to settle from the aqueous solution under a pH of 11 or above. The pH can be adjusted by supplying an alkaline agent (a compound having an action that tends to render a liquid alkaline, such as urea) to the aqueous solution. This crystallite A precursor preparation step may also include treatment in which a noble metal is supported on the crystallite A precursor. For example, it is desirable to support a noble metal on the crystallite A precursor by dispersing the crystallite A precursor in water, then adding a noble metal under a pH of 12 or higher. The production method disclosed herein is preferably carried out in an embodiment that supports a noble metal on an unfired crystallite A precursor.

<Crystallite B Precursor Preparation Step>

This production method also includes a step in which a B crystallite precursor is obtained by causing a co-precipitate to settle out from an aqueous solution containing the constituent elements of the B crystallites (crystallite B precursor preparation step). The solvent (aqueous solvent) in the aqueous solution is typically water, and may be a mixed solvent composed primarily of water. For example, it is desirable to use an aqueous solution that contains, in an aqueous solvent, compounds capable of supplying Ce ions and the like. This crystallite B precursor preparation step may include the stage of heating the aqueous solution to between 80° C. and 100° C. (preferably between 90° C. and 95° C.), then causing a co-precipitate to settle from the aqueous solution under a pH of 11 or above. The pH can be adjusted by supplying an alkaline agent (a compound having an action that tends to render a liquid alkaline, such as urea) to the aqueous solution.

<Slurry Preparation Step>

In this embodiment, a mixed slurry is prepared by mixing together the Crystallite A precursor and the Crystallite B precursor thus formed (slurry preparation step). In this slurry preparation step, typically, the Crystallite A Precursor and the Crystallite B Precursor are added to water, after which an organic acid and aqueous hydrogen peroxide are added and stirring is carried out, giving a mixed slurry. Malonic acid or the like may be suitably used as the organic acid. The production method disclosed herein is preferably carried out in an embodiment that uses such an organic acid and aqueous hydrogen peroxide. The slurry preparation step may also include heating the mixed slurry, followed by agitation in a disperser (e.g., a homogenizer). The heating temperature may be set to between 75° C. and 90° C. (preferably, between 80° C. and 85° C.). The agitation time may be any time up until the mixed slurry mixes uniformly. For example, this time may be set to 5 minutes or more (e.g., 5 minutes to 120 minutes), preferably 15 minutes or more, more preferably 30 minutes or more, and more preferably 60 minutes or more. With an agitation time within this range, oxide particles having a smaller number of crystallites of the same type, which are contiguous to one another.

<Firing Step>

After agitation of the mixed slurry as described above, the slurry is washed and dried. The mixture is then fired, giving oxide particles composed of A crystallites and B crystallites (firing step). It is desirable to carry out this firing step in open air or in an atmosphere that is more oxygen-rich than open air. In an open-air atmosphere, it is preferable to set the maximum firing temperature in the range of 700° C. or more and up to 900° C. The firing time may be set to, e.g., from 3 hours to 8 hours. Oxide particles composed of A crystallites and B crystallites can thereby be obtained.

In addition to oxide particles composed of the differing A crystallites and B crystallites, the catalyst layer of the exhaust gas-purifying catalyst disclosed herein may also have one, two or more other carriers. For example, preferred use can be made of a porous carrier composed of an inorganic compound having a somewhat large specific surface area (which refers, here and below, to a specific surface area measured by the BET method). Examples of preferred carriers include alumina ($Al_2O_3$), ceria ($CeO_2$), zirconia ($ZrO_2$), silica ($SiO_2$), titania ($TiO_2$), and solid solutions (e.g., ceria-zirconia composite oxides (CZ composite oxides)) or combinations thereof. To increase the thermal stability of the exhaust gas-purifying catalyst, a ceramic having good heat resistance, such as alumina or zirconia, may be included in the catalyst layer, either as a carrier or as a non-supporting material (the latter referring, here and below, to a catalyst layer component that does not support a noble metal).

The carrier or the non-supporting material in particulate form (e.g., alumina powder) preferably has a specific surface area of 30 $m^2/g$ or more. From the standpoint of heat resistance and structural stability, a carrier such as alumina preferably has a specific surface area of 50 $m^2/g$ or more, such as from 50 to 500 $m^2/g$ (e.g., from 200 to 400 $m^2/g$). The average particle size of the carrier particles, although not particularly limited, is preferably at least about 1 nm and up to about 500 nm (more preferably, at least 10 nm and up to 200 nm).

When such an inorganic compound (ceramic) is used as a carrier, the noble metal content per unit volume (in liters) of catalyst is typically about 0.1 to 10 g/L, and preferably about 0.2 to 5 g/L. Too high a noble metal content is undesirable in terms of cost, whereas too low a content is undesirable on account of the low exhaust gas-purifying ability. Here, "unit volume (in liters) of catalyst" refers to a bulk volume (in liters) that includes, in addition to the volume occupied by the material of the substrate, the volume of cells at the interior (i.e., it includes the catalyst layer formed within such cells).

An exhaust gas-purifying catalyst constituted as described above may be produced by a manufacturing process similar to those hitherto used in the art.

By way of illustration, first, a slurry containing a powder of a desired carrier that supports a noble metal such as Pd, Pt or Rh (an ordinary carrier such as an oxide, alumina or zirconia consisting of A crystallites may be included) and a powder of a non-supporting material that does not support a noble metal (a non-supporting material such as an oxide, alumina or zirconia consisting of B crystallites may be included) is coated onto a honeycomb substrate by a known washcoating method or the like. The slurry coating is then fired at a given temperature and for a given time, thereby forming a catalyst layer on the substrate.

The washcoated slurry firing conditions vary depending on the shape and size of the substrate or carrier, and so are not particularly limited. However, typically the target catalyst layer can be formed by carrying out firing at about 400 to 1000° C. for about 1 to 4 hours. The drying conditions prior to firing are not particularly limited, although drying at a temperature of 80 to 300° C. (e.g., 150 to 250° C.) for about 1 to 12 hours is preferred. When forming a catalyst layer by such a washcoating process, a binder may be included in the slurry so that the slurry adheres well to the substrate surface and, in the case of a catalyst layer having a laminated structure, to promote adherence of the upper layer-forming slurry to the surface of the underlying layer. The binder used for this purpose is preferably an alumina sol, a silica sol or the like.

The invention is illustrated below by way of a number of working examples, although these examples are not intended to limit the invention.

Test Example 1: Production of Exhaust Gas-Purifying Catalysts

Working Example 1

A mixed solution was prepared by adding 16.87 g of a cerium nitrate solution (20 mass % as $CeO_2$), 434.8 g of a zirconium oxynitrate solution (10 mass % as $ZrO_2$), 13.19 g of a lanthanum nitrate solution (10 mass % as $Nd_2O_3$), 13.28 g of an yttrium nitrate solution (10 mass % as $Y_2O_3$) and 0.05 g of polyvinylpyrrolidone (available under the trade name PVP K-30) to 700 mL of deionized water and stirring.

This mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration and washed with pure water, giving Precursor a1.

Next, the entire amount of Precursor a1 was added to 1,000 mL of deionized water and dispersed, after which the pH was adjusted to 12 by adding an aqueous solution of sodium hydroxide. This was followed by the addition of 10 g of a rhodium nitrate solution (5 mass % as rhodium), thereby supporting rhodium on Precursor a1, following which the aqueous solution was removed by suction filtration, giving a Rh-loaded Precursor a1. The filtrate was analyzed by ICP emission spectroscopy, whereupon the rhodium loading efficiency was 100%.

In a separate procedure, a mixed solution was prepared by adding 105.7 g of a cerium nitrate solution (20 mass % as $CeO_2$), 259.5 g of zirconium oxynitrate solution (10 mass % as $ZrO_2$), 17.71 g of a neodymium nitrate solution (10 mass % as $Nd_2O_3$), 11.43 g of a lanthanum nitrate solution (10 mass % as $La_2O_3$) and 0.05 g of PVP K-30 (trade name) to 700 mL of deionized water and stirring.

The mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration and washed with pure water, giving Precursor b1.

The entire amounts of Rh-loaded Precursor a1 and Precursor b1 were added to 1,000 mL of deionized water, following which 1 g of malonic acid as an organic acid and 10 g of 3% aqueous hydrogen peroxide were added and stirring was carried out. The mixed slurry thus prepared was heated to 80 to 85° C. and then agitated for 60 minutes in a homogenizer. Next, the slurry was filtered, washed with pure water, then dried at 110° C. and subsequently fired for 5 hours at 800° C. in open air, giving a Powder A1B1. This powder A1B1 was furnished to TEM-EDX measurement (magnification, 200,000× to 400,000×; 50 fields), and the properties of the powder were investigated.

From the TEM-EDX measurement results, the powder A1B1 obtained in Working Example 1 was confirmed to contain Rh-loaded crystallites A1 having a content (mol %) of the constituent metallic elements, expressed in terms of the oxides thereof, of Zr/Ce/Nd/Y=90/5/2/3, and crystallites B1 having a content (mol %) of the constituent metallic elements, expressed in terms of the oxides thereof, of Ce/Zr/Nd/La=35/60/3/2.

Moreover, the A1 crystallites and B1 crystallites were each confirmed to be present in this powder A1B1 in a highly dispersed manner such that ten or more of the same type of crystallite were nowhere mutually contiguous. Specifically, TEM-EDX measurement (enlargement, 200,000× to 400,000×; 50 fields) was used to analyze the elemental compositions of 50 consecutive crystallites on a random straight line and thereby differentiate the A crystallites and B crystallites, in addition to which the maximum number of serially contiguous A crystallites and the maximum number of serially contiguous B crystallites were determined for the 50 crystallites thus analyzed. This was similarly carried out in 50 fields, and the average of the maxima in the respective fields was treated as the number of serially contiguous A crystallites or B crystallites. The results are shown in the corresponding column of Table 1. As shown in Table 1, the number of serially contiguous A crystallites in the powder A1B1 obtained in Working Example 1 was two and the number of serially contiguous B crystallites was three.

This powder A1B1 was powder compacted and then crushed, giving a pelletized catalyst 1 having a particle size of 0.5 to 1.0 mm for the subsequently described catalyst activity evaluation test.

Working Example 2

Aside from changing the agitation time in the homogenizer from 60 minutes to 15 minutes, a pelletized Catalyst II for a catalyst activity evaluation test was obtained by the same process as in Working Example 1. The TEM-EDX measurement results and other properties of Catalyst II are shown in the corresponding column in Table 1.

Working Example 3

Aside from changing the agitation time in the homogenizer from 60 minutes to 5 minutes, a pelletized Catalyst III for a catalyst activity evaluation test was obtained by the same process as in Working Example 1. The TEM-EDX measurement results and other properties of Catalyst III are shown in the corresponding column in Table 1.

Working Example 4

Aside from not using malonic acid and aqueous hydrogen peroxide, a pelletized Catalyst IV for a catalyst activity evaluation test was obtained by the same process as in Working Example 1. The TEM-EDX measurement results and other properties of Catalyst IV are shown in the corresponding column in Table 1.

Comparative Example 1

Aside from not using malonic acid and aqueous hydrogen peroxide, not heating the mixed slurry and not using the homogenizer, a pelletized Catalyst V for a catalyst activity evaluation test was obtained by the same process as in Working Example 1. The TEM-EDX measurement results and other properties of Catalyst V are shown in the corresponding column in Table 1.

Comparative Example 2

A mixed solution was prepared by adding 16.87 g of a cerium nitrate solution (20 mass % as $CeO_2$), 434.8 g of a zirconium oxynitrate solution (10 mass % as $ZrO_2$), 13.19 g of a neodymium nitrate solution (10 mass % as $Nd_2O_3$), 13.28 g of an yttrium nitrate solution (10 mass % as $Y_2O_3$) and 0.05 g of PVP K-30 (trade name) to 700 mL of deionized water, and stirring.

The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration, washed with pure water, and then dried at 110° C. and fired for 5 hours at 800° C. in open air, giving a Powder A1.

The entire amount of Powder A1 was added to 1,000 mL of deionized water and dispersed, following which the pH was adjusted to 12 by adding an aqueous solution of sodium hydroxide. Next, 10 g of a rhodium nitrate solution (5 mass % as rhodium) was added, thereby supporting rhodium on Powder A1, following which the aqueous solution was removed by suction filtration, giving a Rh-loaded Powder A1. The filtrate was analyzed by ICP emission spectroscopy, whereupon the rhodium loading efficiency was 100%.

The Rh-loaded powder A1 was dried at 110° C. and then fired for 5 hours at 800° C. in open air, giving a Rh-loaded powder A1 (Rh/A1) according to Comparative Example 2.

From the TEM-EDX measurement results, the powder Rh/A1 obtained in this Comparative Example 2 was confirmed to contain Rh-loaded crystallites A1 having a content (mol %) of the constituent metallic elements, expressed in terms of the oxides thereof, of Zr/Ce/Nd/Y=90/5/2/3.

In a separate procedure, a mixed solution was prepared by adding 105.7 g of a cerium nitrate solution (20 mass % as $CeO_2$), 259.5 g of a zirconium oxynitrate solution (10 mass as $ZrO_2$), 17.71 g of a neodymium nitrate solution (10 mass % as $Nd_2O_3$), 11.43 g of a lanthanum nitrate solution (10 mass % as $La_2O_3$) and 0.05 g of PVP K-30 (trade name) to 700 mL of deionized water, and stirring.

The mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration, washed with pure water, and then dried at 110° C. and fired for 5 hours at 800° C. in open air, giving a Powder B1.

From the TEM-EDX measurement results, the powder B1 obtained in this Comparative Example 2 was confirmed to contain crystallites B1 having a content (mol %) of the constituent metallic elements, expressed in terms of the oxides thereof, of Ce/Zr/Nd/La=35/60/3/2.

A mixed slurry was prepared by dispersing the Powder Rh/A1 (25 g) and the Powder B1 (25 g) in 400 mL of deionized water and agitating. This mixed slurry was suction filtered to remove the aqueous solution, and then dried for 12 hours at 110° C. and fired at 500° C. in open air, giving a powder A1+B1. This catalyst was powder compacted and then crushed, giving a pelletized catalyst VI having a particle size of 0.5 to 1.0 mm for the subsequently described catalyst activity evaluation test. The TEM-EDX measurement results and other properties of Catalyst VI are shown in the corresponding column in Table 1.

Working Example 5

Aside from using 10 g of a dinitrodiammine platinum nitrate solution (5 mass % as Pt) instead of 10 g of the rhodium nitrate solution (5 mass % as Rh) used in Working Example 1, a pelletized Catalyst VII for a catalyst activity evaluation test was obtained by the same process as in Working Example 1. The TEM-EDX measurement results and other properties of this Catalyst VII are shown in the corresponding column in Table 1.

Comparative Example 3

Aside from using 10 g of a dinitrodiammine platinum nitrate solution (5 mass % as Pt) instead of 10 g of the rhodium nitrate solution (5 mass % as Rh) used in Working Example 2, a pelletized catalyst VIII for a catalyst activity evaluation test was obtained by the same process as in Working Example 2. The TEM-EDX measurement results and other properties of this Catalyst VIII are shown in the corresponding column in Table 1.

Working Example 6

Aside from using 10 g of a palladium nitrate solution (5 mass % as Pd) instead of 10 g of the rhodium nitrate solution (5 mass % as Rh) used in Working Example 1, a pelletized catalyst IX for a catalyst activity evaluation test was obtained by the same process as in Working Example 1. The TEM-EDX measurement results and other properties of this Catalyst IX are shown in the corresponding column in Table 1.

Comparative Example 4

Aside from using 10 g of a palladium nitrate solution (5 mass % as Pd) instead of 10 g of the rhodium nitrate solution (5 mass % as Rh) used in Working Example 2, a pelletized catalyst X for a catalyst activity evaluation test was obtained by the same process as in Working Example 2. The TEM-EDX measurement results and other properties of this Catalyst X are shown in the corresponding column in Table 1.

Comparative Example 5

A mixed solution was prepared by adding 17.04 g of a cerium nitrate solution (20 mass % as $CeO_2$), 439.2 g of a zirconium oxynitrate solution (10 mass % as $ZrO_2$), 13.32 g of a neodymium nitrate solution (10 mass % as $Nd_2O_3$), 13.41 g of an yttrium nitrate solution (10 mass % as $Y_2O_3$) and 0.05 g of PVP K-30 (trade name) to 700 mL of deionized water, and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a1.

In a separate procedure, a mixed solution was prepared by adding 104.6 g of a cerium nitrate solution (20 mass % as $CeO_2$), 256.9 g of a zirconium oxynitrate solution (10 mass % as $ZrO_2$), 17.53 g of a neodymium nitrate solution (10 mass % as $Nd_2O_3$), 11.32 g of a lanthanum nitrate solution (10 mass % as $La_2O_3$) and 0.05 g of PVP K-30 (trade name) to 700 mL of deionized water, and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor b1.

The entire amount of Precursor b1 was added to 1,000 mL of deionized water and dispersed, following which the pH was adjusted to 12 by adding an aqueous solution of sodium hydroxide. Next, 10 g of a rhodium nitrate solution (5 mass % as Rh) was added, thereby supporting rhodium on Precursor b1, following which the aqueous solution was removed by suction filtration, giving Rh-loaded Precursor b1. The filtrate was analyzed by ICP emission spectroscopy, whereupon the rhodium loading efficiency was 100%.

The entire amounts of Precursor a1 and Rh-loaded Precursor b1 were added to 1,000 mL of deionized water, following which 1 g of malonic acid as an organic acid and 10 g of 3% aqueous hydrogen peroxide were added and stirring was carried out. The mixed slurry thus prepared was heated to 80 to 85° C. and then agitated for 60 minutes in a homogenizer. Next, the slurry was filtered, washed with pure water, and then dried at 110° C. and subsequently fired for 5 hours in at 800° C. open air, giving an exhaust gas-purifying catalyst (Rh/A1B1) according to this Comparative Example 5.

From the TEM-EDX measurement results, the powder Rh/A1B1 obtained in Comparative Example 5 was confirmed to contain Al crystallites having a content (mol %) of the constituent metallic elements, expressed in terms of the oxides thereof, of Zr/Ce/Nd/Y=90/5/2/3, and Rh-loaded B1 crystallites having a content (mol %) of the constituent metallic elements, expressed in terms of the oxides thereof, of Ce/Zr/Nd/La=35/60/3/2.

This catalyst powder Rh/A1B1 was powder compacted and then crushed, giving a pelletized catalyst XI having a particle size of 0.5 to 1.0 mm for the subsequently described catalyst activity evaluation test. The TEM-EDX measurement results and other properties of Catalyst XI are shown in the corresponding column in Table 1.

Working Example 7

A mixed solution was prepared by adding 537.5 g of a zirconium oxynitrate solution (10 mass % as $ZrO_2$), 4.98 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a2.

The entire amount of Precursor a2 was added to 1,000 mL of deionized water and dispersed, following which the pH was adjusted to 12 by adding an aqueous solution of sodium hydroxide. Next, 15 g of a rhodium nitrate solution (5 mass % as Rh) was added, thereby supporting rhodium on Precursor a2, following which the aqueous solution was removed by suction filtration, giving a Rh-loaded Precursor a2. The filtrate was analyzed by ICP emission spectroscopy, whereupon the rhodium loading efficiency was 100%.

In a separate procedure, a mixed solution was prepared by adding 151.4 g of a cerium nitrate solution (20 mass % as $CeO_2$), 126.5 g of a zirconium oxynitrate solution (10 mass % as $ZrO_2$), 3.29 g of a calcium nitrate solution (5 mass % as CaO), 19.11 g of a lanthanum nitrate solution (10 mass % as $La_2O_3$) and 0.05 g of PVP K-30 (trade name) to 700 mL of deionized water and stirring. The mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration and washed with pure water, giving Precursor b2.

The entire amounts of Rh-loaded Precursor a2 and Precursor b2 were added to 1,000 mL of deionized water, following which 1 g of malonic acid as an organic acid and 10 g of 3% aqueous hydrogen peroxide were added and stirring was carried out. The mixed slurry thus prepared was heated to 80 to 85° C. and then agitated for 60 minutes in a homogenizer. Next, the slurry was filtered, washed with pure water, then dried at 110° C. and subsequently fired for 5 hours at 800° C. in open air, giving an exhaust gas-purifying catalyst (Rh/A2B2) according to this Working Example 7.

From the TEM-EDX measurement results, the powder Rh/A2B2 obtained in this Working Example 7 was confirmed to contain Rh-loaded A2 crystallites having a content (mol %) of the constituent metallic elements, expressed in terms of the oxides thereof, of Zr/Y=99/1, and B2 crystallites having a content (mol %) of the constituent metallic elements, expressed in terms of the oxides thereof, of Ce/Zr/La/Ca=60/35/4/1. This catalyst powder Rh/A2B2 was powder compacted and then crushed, giving a pelletized catalyst XII having a particle size of 0.5 to 1.0 mm for the subsequently described catalyst activity evaluation test. The TEM-EDX measurement results and other properties of Catalyst XII are shown in the corresponding column in Table 1.

Working Example 8

A mixed solution was prepared by adding 36.59 g of a cerium nitrate solution (20 mass % as $CeO_2$), 445.3 g of a zirconium oxynitrate solution (10 mass % as $ZrO_2$), 24.00 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a3.

Next, aside from using this Precursor a3 instead of the Precursor a2 used in Working Example 7, a Powder A3B2 was obtained by the same process as in Working Example 7. From the TEM-EDX measurement results, the powder A3B2 obtained in this Working Example 8 was confirmed to contain Rh-loaded A3 crystallites having a content (mol %) of the constituent metallic elements, expressed in terms of the oxides thereof, of Zr/Ce/Y=85/10/5, and B2 crystallites having a content (mol %) of the constituent metallic elements, expressed in terms of the oxides thereof, of Ce/Zr/La/Ca=60/35/4/1.

Aside from using this Powder A3B2 instead of the Powder A2B2, a pelletized catalyst XIII for catalyst activity evaluation testing was obtained by the same process as in Working Example 7. The TEM-EDX measurement results and other properties of Catalyst XIII are shown in the corresponding column in Table 1.

Working Example 9

A mixed solution was prepared by adding 70.24 g of a cerium nitrate solution (20 mass % as $CeO_2$), 378.4 g of a zirconium oxynitrate solution (10 mass % as $ZrO_2$), 23.12 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a4.

Next, aside from using this Precursor a4 instead of the Precursor a2 used in Working Example 7, a Powder A4B2 was obtained by the same process as in Working Example 7. From the TEM-EDX measurement results, the powder A4B2 obtained in this Working Example 9 was confirmed to contain Rh-loaded A4 crystallites having a content (mol %) of the constituent metallic elements, expressed in terms of the oxides thereof, of Zr/Ce/Y=75/20/5, and B2 crystallites having a content (mol %) of the constituent metallic elements, expressed in terms of the oxides thereof, of Ce/Zr/La/Ca=60/35/4/1.

Aside from using this Powder A4B2 instead of the Powder A2B2, a pelletized catalyst XIV for catalyst activity evaluation testing was obtained by the same process as in Working Example 7. The TEM-EDX measurement results and other properties of Catalyst XIV are shown in the corresponding column in Table 1.

Working Example 10

A mixed solution was prepared by adding 101.9 g of a cerium nitrate solution (20 mass % as $CeO_2$), 316.3 g of a zirconium oxynitrate solution (10 mass % as $ZrO_2$), 22.30 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a5.

Next, aside from using this Precursor a5 instead of the Precursor a2 used in Working Example 7, a Powder A5B2 was obtained by the same process as in Working Example 7. From the TEM-EDX measurement results, the powder A5B2 obtained in this Working Example 10 was confirmed to contain Rh-loaded A5 crystallites having a content (mol %) of the constituent metallic elements, expressed in terms of the oxides thereof, of Zr/Ce/Y=65/30/5, and B2 crystallites having a content (mol %) of the constituent metallic elements, expressed in terms of the oxides thereof, of Ce/Zr/La/Ca=60/35/4/1.

Aside from using this Powder A5B2 instead of the Powder A2B2, a pelletized catalyst XV for catalyst activity evaluation testing was obtained by the same process as in Working Example 7. The TEM-EDX measurement results and other properties of Catalyst XV are shown in the corresponding column in Table 1.

Comparative Example 6

A mixed solution was prepared by adding 131.3 g of a cerium nitrate solution (20 mass % as $CeO_2$), 258.4 g of a zirconium oxynitrate solution (10 mass % as $ZrO_2$), 21.53 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a6.

Next, aside from using this Precursor a6 instead of the Precursor a2 used in Working Example 7, a Powder A6B2 was obtained by the same process as in Working Example 7. From the TEM-EDX measurement results, the powder A6B2 obtained in this Comparative Example 6 was confirmed to contain Rh-loaded A6 crystallites having a content (mol %) of the constituent metallic elements, expressed in terms of the oxides thereof, of Zr/Ce/Y=55/40/5, and B2 crystallites having a content (mol %) of the constituent metallic elements, expressed in terms of the oxides thereof, of Ce/Zr/La/Ca=60/35/4/1.

Aside from using this Powder A6B2 instead of the Powder A2B2, a pelletized catalyst XVI for catalyst activity evaluation testing was obtained by the same process as in Working Example 7. The TEM-EDX measurement results and other properties of Catalyst XVI are shown in the corresponding column in Table 1.

Comparative Example 7

A mixed solution was prepared by adding 158.6 g of a cerium nitrate solution (20 mass % as $CeO_2$), 204.4 g of a zirconium oxynitrate solution (10 mass % as $ZrO_2$), 20.81 g of an yttrium nitrate solution (10 mass % as $Y_2O_3$) and 0.05 g of PVP K-30 (trade name) to 700 mL of deionized water and stirring. The mixed solution was heated to 90 to 95° C., following which the pH was adjusted to 11 by adding urea, thereby giving a co-precipitate. Next, 13 g of hydrazine was added and the system was stirred for 12 hours at 90 to 95° C. The resulting co-precipitate was collected by filtration and washed with pure water, giving Precursor a7.

Next, aside from using this Precursor a7 instead of the Precursor a2 used in Working Example 7, a Powder A7B2 was obtained by the same process as in Working Example 7. From the TEM-EDX measurement results, the powder A7B2 obtained in this Comparative Example 7 was confirmed to contain Rh-loaded A7 crystallites having a content (mol %) of the constituent metallic elements, expressed in terms of the oxides thereof, of Zr/Ce/Y=45/50/5, and B2 crystallites having a content (mol %) of the constituent metallic elements, expressed in terms of the oxides thereof, of Ce/Zr/La/Ca=60/35/4/1.

Aside from using this Powder A7B2 instead of the Powder A2B2, a pelletized catalyst XVII for catalyst activity evaluation testing was obtained by the same process as in Working Example 7. The TEM-EDX measurement results and other properties of Catalyst XVII are shown in the corresponding column in Table 1.

Comparative Example 11

Aside from using Precursor b2 instead of the Precursor b1 used in Working Example 1, the Powder A1B2 was obtained by the same process as in Working Example 1. Moreover, aside from using this Powder A1B2 instead of the Powder A1B1, a pelletized catalyst for catalyst activity evaluation testing was obtained by the same process as in Working Example 1. The TEM-EDX measurement results and other properties of this catalyst are shown in the corresponding column in Table 1.

TABLE 1

| Examples | Oxide composition | Number of serially contiguous crystallites | | Specific surface area of powder | Noble metal concentration | 50% Purification temperature (° C.) | |
|---|---|---|---|---|---|---|---|
| | | A crystallites | B crystallites | | | HC | NO$_x$ |
| Working Example 1 | A1B1 | 2 | 3 | 42 | Rh: 0.5 (supported on A crystallites) | 343 | 340 |
| Working Example 2 | " | 4 | 3 | 39 | Rh: 0.5 (supported on A crystallites) | 46 | 342 |
| Working Example 3 | " | 5 | 5 | 37 | Rh: 0.5 (supported on A crystallites) | 348 | 345 |
| Working Example 4 | " | 8 | 7 | 30 | Rh: 0.5 (supported on A crystallites) | 362 | 360 |
| Comparative Example 1 | " | 16 | 16 | 23 | Rh: 0.5 (supported on A crystallites) | 375 | 372 |
| Comparative Example 2 | " | 22 | 23 | 21 | Rh: 0.5 (supported on A crystallites) | 386 | 384 |
| Working Example 5 | " | 2 | 2 | 43 | Pt: 0.5 (supported on A crystallites) | 380 | 386 |
| Comparative Example 3 | " | 23 | 23 | 20 | Pt: 0.5 (supported on A crystallites) | 423 | 425 |
| Working Example 6 | " | 3 | 3 | 40 | Pd: 0.5 (supported on A crystallites) | 372 | 373 |
| Comparative Example 4 | " | 22 | 22 | 21 | Pd: 0.5 (supported on A crystallites) | 409 | 410 |
| Comparative Example 5 | " | 2 | 2 | 43 | Rh: 0.5 (supported on B crystallites) | 365 | 371 |
| Working Example 7 | A2B2 | 4 | 4 | 38 | Rh: 0.75 (supported on A crystallites) | 332 | 329 |
| Working Example 8 | A3B2 | 2 | 2 | 42 | Rh: 0.75 (supported on A crystallites) | 331 | 329 |
| Working Example 9 | A4B2 | 3 | 4 | 38 | Rh: 0.75 (supported on A crystallites) | 334 | 331 |
| Working Example 10 | A5B2 | 5 | 5 | 36 | Rh: 0.75 (supported on A crystallites) | 338 | 336 |
| Comparative Example 6 | A6B2 | 7 | 8 | 26 | Rh: 0.75 (supported on A crystallites) | 353 | 351 |
| Comparative Example 7 | A7B2 | 9 | 9 | 24 | Rh: 0.75 (supported on A crystallites) | 359 | 357 |
| Working Example 11 | A1B2 | 3 | 3 | 40 | Rh: 0.5 (supported on A crystallites) | 359 | 358 |

Makeup of A crystallites (mol %)
A1: Zr/Ce/Nd/Y oxide = 90/5/2/3
A2: Zr/Y oxide = 99/1
A3: Zr/Ce/Y oxide = 85/10/5
A4: Zr/Ce/Y oxide = 75/20/5
A5: Zr/Ce/Y oxide = 65/30/5
A6: Zr/Ce/Y oxide = 55/40/5
A7: Zr/Ce/Y oxide = 45/50/5
Makeup of B crystallites (mol %)
B1: Ce/Zr/Nd/La oxide = 35/60/3/2
B2: Ce/Zr/La/Ca oxide = 60/35/4/1

As shown in Table 1, in the catalysts obtained in the respective working examples, the A crystallites and B crystallites are each present in a highly interdispersed state such that, based on electron microscopic observation, ten or more crystallites of the same type are nowhere mutually contiguous. In other words, the number of crystallites of the same type that are mutually contiguous as defined above was nine or less. On the other hand, in the catalysts according to Comparative Examples 1 to 4, under electron microscopic observation, ten or more crystallites of the same type were found to be mutually contiguous. That is, the number of crystallites of the same type that are serially contiguous as defined above was high compared with the catalysts in the working examples; in some catalysts in the comparative examples, the number of crystallites of the same type that are serially contiguous was found to be more than 20.

Test Example 2: Degree of Crystal Growth in High-Temperature Treatment—Measurement of Specific Surface Area The BET specific surface areas ($m^2/g$) following heat treatment of the respective catalysts in Working Examples 1 to 10 and Comparative Examples 1 to 7 obtained in Test Example 1 were determined.

Specifically, 5 hours of heat treatment (firing) at 1,150° C. was carried out on each catalyst (each powder) in open air, following which the surface area was measured based on a common BET method. The results are shown in Table 1.

As shown in Table 1, the specific surface area of the catalyst powder (oxide particles) in each of the working examples was 30 $m^2/g$ or more, and was 40 $m^2/g$ or more in several cases. By contrast, the specific surface area of the catalyst powder (oxide particles) in Comparative Examples 1 to 4 was 25 $m^2/g$ or less in each case. This indicates that, in the catalysts of the working examples where different types of crystallites are present in an interdispersed state, the different types of crystallites mutually serve as barriers that obstruct crystal growth, thus enabling a decrease in the specific surface area to be effectively prevented.

Test Example 3: Evaluation of Catalyst Activity

The catalytic activities of the respective catalysts from Working Examples 1 to 10 and Comparative Examples 1 to 7 in Test Example 1 after being subjected to heat endurance tests were evaluated.

Specifically, the respective catalysts (i.e., the pelletized catalysts described above) were placed in a flow-type heat endurance testing apparatus and heat endurance treatment was carried out in which a lean gas obtained by adding 6 mol % of oxygen ($O_2$) to nitrogen gas and a rich gas obtained by adding 6 mol % of carbon monoxide (CO) to nitrogen gas were passed through for 100 hours in alternating three-minute periods at a gas flow rate of 500 mL/min and a catalyst bed temperature of 850° C.

Next, the treated catalyst was placed in a normal-pressure fixed-bed flow reactor and, while passing a stoichiometric model gas through the catalyst within the apparatus, the temperature was raised from 100° C. to 500° C. at a rate of 12° C./min, during which time the HC conversion efficiency and the $NO_x$ conversion efficiency were continuously measured. The temperatures when these conversion efficiencies reached 50% were determined as the 50% conversion temperatures. The results are shown in the corresponding columns in Table 1. In addition, some of the results (Working Examples 1 to 4 and 7 to 10, and Comparative Examples 1, 2, 6 and 7) are shown in FIGS. 3 to 5.

Figure 3:
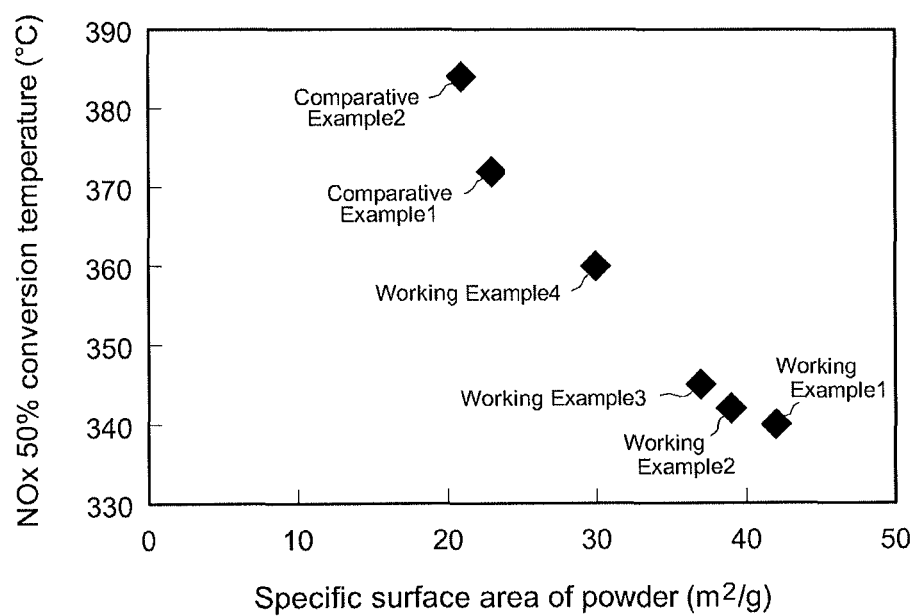
FIG. 3 is a graph showing the relationship between the specific surface area of a powder and the $NO_x$ 50% conversion temperature.
Figure 4:
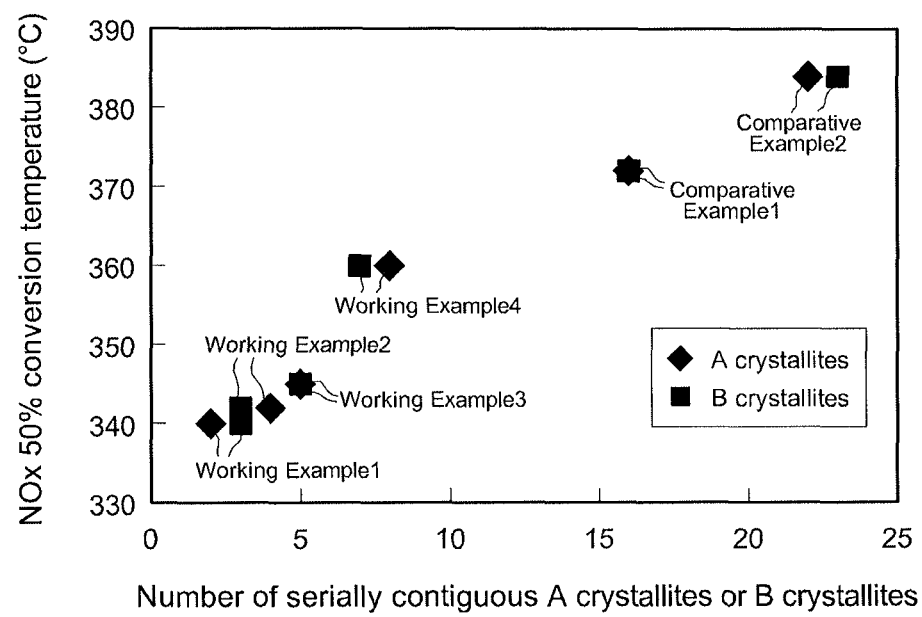
FIG. 4 is a graph showing the relationship between the number of serially contiguous crystallites and the $NO_x$ 50% conversion temperature.
Figure 5:
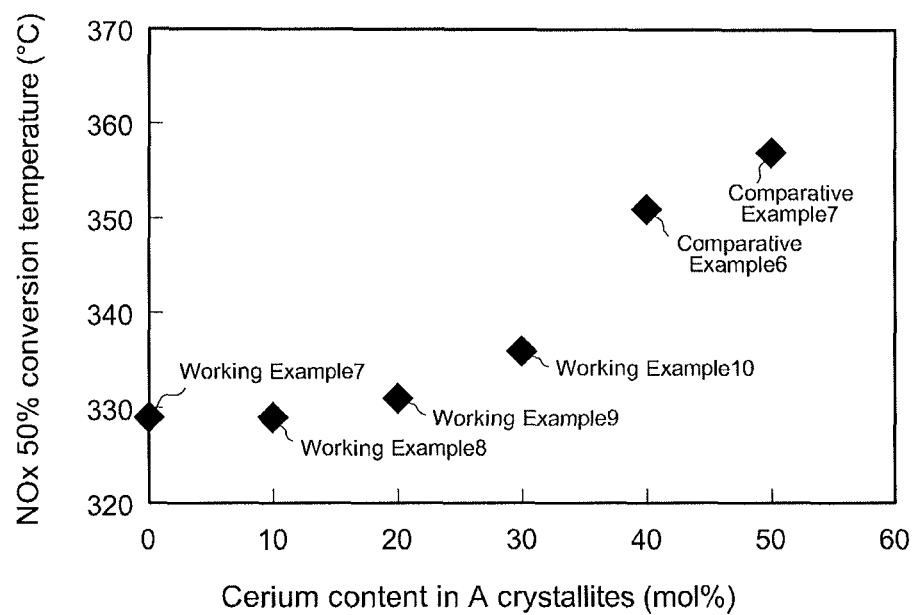
FIG. 5 is a graph showing the relationship between the cerium content and the $NO_x$ 50% conversion temperature.

As shown in Table 1 and FIGS. 3 to 5, regardless of the type of PGM (Pd, Pt, Rh) supported, the 50% HC conversion temperatures and 50% $NO_x$ conversion temperatures of the catalysts in the working examples were lower than the 50% HC conversion temperatures and 50% $NO_x$ conversion temperatures of the catalysts in the comparative examples. This indicates that, in the catalysts of the working examples wherein different types of crystallites are present in an interdispersed state, the different types of crystallites mutually serve as barriers which obstruct crystal growth, preventing agglomeration of the noble metals (here, PGM) and decreased OSC function, and thus enabling a high catalytic activity to be maintained.

In addition, as is apparent from Table 1, the catalysts in the respective working examples wherein a noble metal is supported on A crystallites having a low Ce content, compared with the catalyst in Comparative Example 5 wherein a noble metal is supported on B crystallites having a high Ce content, had low 50% HC conversion temperatures and low 50% $NO_x$ conversion temperatures. This confirmed that, in an aggregate composed of mixed particles of these different crystallites having differing Ce contents, by supporting a noble metal on the A crystallites having a low Ce content and not supporting a noble metal on the B crystallites having a high Ce content, an even higher catalytic activity is obtained. Also, the catalyst of Working Example 2 in which the Powder A1B1 (i.e., a powder in which the Ce content of the A crystallites was 5 mol % and the Ce content of the B crystallites was 35 mol %) was used, when compared with the catalyst of Working Example 11 in which the Powder A1B2 (i.e., a powder in which the Ce content of the A crystallites was 5 mol % and the Ce content of the B crystallites was 60 mol %) was used, in spite of having a comparable number of crystallites of the same type that are serially contiguous and a comparable specific surface area, showed somewhat of a decline in both the 50% HC conversion temperature and the 50% $NO_x$ conversion temperature. It is apparent from this that a higher catalytic activity is obtained by lowering the Ce content of the B crystallites. From the standpoint of obtaining a higher catalytic activity, the Ce content of the B crystallites is generally 50% or less (e.g., from 25% to 50%), preferably 40% or less (e.g., from 25% to 40%), and more preferably 35% or less (e.g., from 25% to 35%). Also, the Ce content of the A crystallites is generally 20% or less (e.g., from 1% to 20%), and preferably 10% or less (e.g., from 1% to 10%).

As is apparent from the above test examples, by using the exhaust gas-purifying catalysts disclosed herein, agglomeration of the noble metals due to crystal growth and decreased OSC are prevented, thus enabling, for example, the catalytic activity of a three-way catalyst (three-way activity) to be stably exhibited. Moreover, by supporting a noble metal on A crystallites having a low Ce content and not supporting a noble metal on B crystallites having a high Ce content, it is possible to both maintain the metallic state of the noble metal and achieve a high OSC function. Accordingly, three-way catalysts and other exhaust gas-purifying catalysts having a higher performance can be provided.

INDUSTRIAL APPLICABILITY

This invention enables the catalyst performance to be further improved in exhaust gas purifying catalysts wherein two types of crystallites are present in an interdispersed state.

The invention claimed is:
1. An exhaust gas-purifying catalyst that is disposed in an exhaust pipe for an internal combustion engine and purifies exhaust gases discharged from the internal combustion engine, comprising:

oxide particles each having interdispersed therein A crystallites that are loaded with a noble metal and B crystallites that are not loaded with a noble metal, wherein:

the A crystallites loaded with a noble metal are composed of an oxide containing at least one of zirconium (Zr) and cerium (Ce), the B crystallites not loaded with a noble metal are composed of a cerium (Ce)-containing oxide having a higher Ce content (mol %) than the oxide making up the A crystallites, the oxide particles have a specific surface area after 5 hours of heat treatment at 1,150° C. in open air of 30 m2/g or more, and the A crystallites and the B crystallites are present within each of the oxide particles in a highly interdispersed manner such that, as observed by electron microscopy, ten or more crystallites of the same type are nowhere mutually contiguous.

2. The exhaust gas-purifying catalyst according to claim 1, wherein the content of cerium (Ce) included in the oxide making up the A crystallites, which is expressed in terms of cerium oxide, is from 0 to 30 mol % of the total oxide, and the content of cerium (Ce) included in the oxide making up the B crystallites, which is expressed in terms of cerium oxide, is from 35 to 99 mol % of the total oxide.

3. The exhaust gas-purifying catalyst according to claim 1, wherein the A crystallites are composed of an oxide containing zirconium (Zr) and also yttrium (Y).

4. The exhaust gas-purifying catalyst according to claim 1, wherein the B crystallites are composed of an oxide containing cerium (Ce) and also zirconium (Zr).

5. The exhaust gas-purifying catalyst according to claim 1, wherein the A crystallites and the B crystallites are present within each of the oxide particles in a highly interdispersed manner such that, as observed by electron microscopy, seven or more crystallites of the same type are nowhere mutually contiguous.

* * * * *